(12) United States Patent
Yoon et al.

(10) Patent No.: US 10,331,267 B2
(45) Date of Patent: Jun. 25, 2019

(54) TOUCH DETECTION METHOD AND TOUCH DETECTOR PERFORMING THE SAME

(71) Applicant: HiDeep Inc., Gyeonggi-do (KR)

(72) Inventors: Sangsic Yoon, Gyeonggi-do (KR); Seyeob Kim, Gyeonggi-do (KR); Bonkee Kim, Gyeonggi-do (KR)

(73) Assignee: HiDeep Inc. (KR)

( * ) Notice: Subject to any disclaimer, the term of this patent is extended or adjusted under 35 U.S.C. 154(b) by 343 days.

(21) Appl. No.: 14/666,408

(22) Filed: Mar. 24, 2015

(65) Prior Publication Data

US 2015/0268783 A1 Sep. 24, 2015

(30) Foreign Application Priority Data

Mar. 24, 2014 (KR) ........................ 10-2014-0034169
May 9, 2014 (KR) ........................ 10-2014-0055732

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0414* (2013.01); *G06F 3/0416* (2013.01); *G06F 2203/04107* (2013.01)

(58) Field of Classification Search
CPC ...... G06F 3/0418; G06F 3/0416; G06F 3/044; G06F 3/0414; G06F 2203/04107
See application file for complete search history.

(56) References Cited

U.S. PATENT DOCUMENTS

| 8,913,031 B2 | 12/2014 | Honda et al. |
| 2007/0030255 A1 | 2/2007 | Pak et al. |
| 2010/0024573 A1 | 2/2010 | Daverman et al. |
| 2010/0123678 A1* | 5/2010 | Kim ........................ G06F 3/044 345/174 |
| 2011/0175845 A1 | 7/2011 | Honda et al. |
| 2012/0038583 A1 | 2/2012 | Westhues et al. |

(Continued)

FOREIGN PATENT DOCUMENTS

CN 102667398 A 9/2012
JP 2007048275 2/2007

(Continued)

OTHER PUBLICATIONS

Corresponding Office Action issued by the JPO dated Apr. 5, 2016.

(Continued)

*Primary Examiner* — Dennis P Joseph
(74) *Attorney, Agent, or Firm* — The Belles Group, P.C

(57) ABSTRACT

Disclosed is a touch detector which detects a touch on a touch sensor panel including a plurality of first electrodes, a plurality of second electrodes and a plurality of third electrodes. The touch detector includes: a driving signal supplier which applies a driving signal to the plurality of first electrodes; and a sensing unit which receives a first signal including information on a capacitance changing depending on the touch on a touch surface of the touch sensor panel from the plurality of second electrodes. The sensing unit detects a touch pressure and a touch position on the touch surface of the touch sensor panel.

14 Claims, 10 Drawing Sheets

(56) References Cited

U.S. PATENT DOCUMENTS

| | | | |
|---|---|---|---|
| 2012/0086666 A1* | 4/2012 | Badaye | G06F 3/0416 345/174 |
| 2013/0016059 A1 | 1/2013 | Lowles et al. | |
| 2013/0033450 A1 | 2/2013 | Coulson et al. | |
| 2013/0234734 A1 | 9/2013 | Iida et al. | |
| 2013/0257784 A1 | 10/2013 | Vandermeijden et al. | |
| 2014/0062934 A1 | 3/2014 | Coulson et al. | |
| 2014/0078080 A1* | 3/2014 | Kim | G06F 3/044 345/173 |
| 2015/0130742 A1* | 5/2015 | Chen | G06F 3/044 345/174 |
| 2015/0212633 A1 | 7/2015 | Yamagishi et al. | |
| 2015/0286332 A1 | 10/2015 | Hotelling et al. | |

FOREIGN PATENT DOCUMENTS

| | | |
|---|---|---|
| JP | 2007272898 | 10/2007 |
| JP | 2011100364 | 5/2011 |
| JP | 2013015976 | 1/2013 |
| JP | WO2013132736 | 7/2015 |
| KR | 20090076126 | 7/2009 |
| KR | 1020110022727 | 3/2011 |
| KR | 20150011271 | 1/2015 |
| WO | 2013132736 | 9/2013 |
| WO | 2014017248 | 1/2014 |

OTHER PUBLICATIONS

Corresponding Office Action issued by the KIPO dated May 31, 2016.
Corresponding search report issued by the EPO dated Aug. 27, 2015.
Corresponding Office Action issued by the JPO dated Sep. 20, 2016.
Corresponding Office Action issued by the KIPO dated Aug. 20, 2015.
Corresponding Office Action issued by the KIPO dated Jul. 17, 2015.
Corresponding Office Action issued by the JPO dated Aug. 15, 2017.
Second Chinese Office Action for related application CN 201610168286.3 dated Nov. 15, 2018.

* cited by examiner

TOUCH DETECTION METHOD AND TOUCH DETECTOR PERFORMING THE SAME

CROSS REFERENCE TO RELATED APPLICATIONS

Priority is claimed under 35 U.S.C. § 119 to Korean Patent Application No.: 10-2014-0034169, filed Mar. 24, 2014 and Korean Patent Application No.: 10-2014-0055732, filed May 9, 2014, the disclosures of which are incorporated herein by reference in their entireties.

FIELD OF THE INVENTION

The present invention relates to a touch detection method and a touch detector performing the same, and more particularly to a touch detection method capable of minimizing errors at the time of detecting the position of a touch on the touch surface of a touch input device by reducing the effect of noise and of accurately detecting the magnitude of a touch pressure, and a touch detector performing the same.

BACKGROUND OF THE INVENTION

A variety of input devices are being used to operate a computing system. For example, input devices like a button, a key, a joystick and a touch screen are being used. Since the touch screen is easy and simple to operate, the touch screen is increasingly being used in operation of the computing system.

The touch screen may include a touch sensor panel which may be a transparent panel including a touch-sensitive surface. The touch sensor panel is attached to the front of the display screen, so that the touch-sensitive surface may cover the visible side of the display screen. The touch screen allows a user to operate the computing system by simply touching the display screen by a finger, etc. In general, the touch screen recognizes the touch on the panel and touch position, and then the computing system analyzes the touch and performs operations in accordance with the analysis.

Here, there is a requirement for a method of reducing errors by minimizing the effect of noise while detecting the touch pressure and touch position on the touch surface of the touch input device.

SUMMARY OF THE INVENTION

One embodiment is a touch detector which detects a touch on a touch sensor panel including a plurality of first electrodes, a plurality of second electrodes and a plurality of third electrodes. The touch detector includes: a driving signal supplier which applies a driving signal to the plurality of first electrodes; and a sensing unit which receives a first signal including information on a capacitance changing depending on the touch on a touch surface of the touch sensor panel from the plurality of second electrodes. The sensing unit detects a touch pressure and a touch position on the touch surface of the touch sensor panel.

Another embodiment is a method for detecting a touch position and a touch pressure in a capacitive touch input device including a touch sensor panel and a driving signal supplier. The method includes: applying a driving signal to the touch sensor panel; and separating and detecting the touch position and touch pressure on a touch surface of the touch sensor panel through at least one of a distinction of electrodes which obtain a detection signal and a distinction of time intervals for obtaining the detection signal.

DETAILED DESCRIPTION OF THE INVENTION

Figure 1:
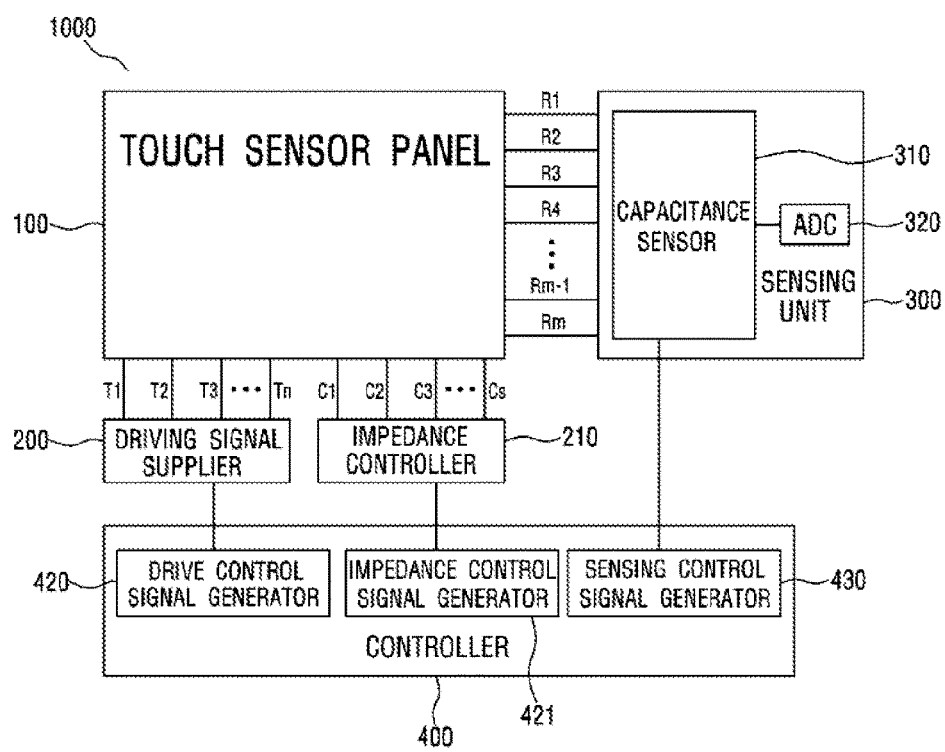
FIG. 1 is a structure view of a touch input device according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a touch input device and a touch detection method according to an embodiment of the present invention will be described with reference to the accompanying drawings.

FIG. 1 is a structure view of a touch input device according to an embodiment of the present invention. Referring to FIG. 1, the touch input device 1000 according to the embodiment of the present invention may include a touch sensor panel 100 which includes a plurality of first electrodes, a plurality of second electrodes and a plurality of third electrodes, a driving signal supplier 200 which applies a driving signal to the plurality of first electrodes, and a sensing unit 300 which receives a first signal including information on a capacitance changing depending on the touch on the touch surface of the touch sensor panel from the plurality of second electrodes and detects a touch position and a touch pressure on the touch surface of the touch sensor panel.

In general, the touch sensor panel 100 may include a plurality of driving electrodes T and a plurality of receiving electrodes R. While the following description and accompanying drawings show that the plurality of driving electrodes T and plurality of receiving electrodes R form an orthogonal array, the present invention is not limited to this. The plurality of driving electrodes T and plurality of receiving electrodes R has an array of arbitrary dimension, for example, a diagonal array, a concentric array, a 3-dimensional random array, etc., and an array obtained by the application of them. Here, the number of the plurality of driving electrodes T and the number of receiving electrodes R are positive integers and may be the same as each other or may have different values. The values may be changed according to the embodiment. Some embodiments of the present invention show that the number of the plurality of driving electrodes T and the number of receiving electrodes R are four respectively.

The plurality of driving electrodes T and the plurality of receiving electrodes R may be arranged to cross each other. The driving electrode T may include the plurality of driving electrodes T extending in a first axial direction. The receiving electrode R may include the plurality of receiving electrodes R extending in a second axial direction crossing the first axial direction.

In the touch sensor panel 100 according to the embodiment of the present invention, the plurality of driving electrodes T and the plurality of receiving electrodes R may be formed in the same layer. For example, the plurality of driving electrodes T and the plurality of receiving electrodes R may be formed on the same side of an insulation layer (reference numeral 130 of FIG. 3). Also, the plurality of driving electrodes T and the plurality of receiving electrodes R may be formed in the different layers. For example, the plurality of driving electrodes T and the plurality of receiving electrodes R may be formed on both sides of one insulation layer (reference numeral 130 of FIG. 3), or the plurality of driving electrodes T may be formed on a side of a first insulation layer (reference numeral 110 of FIG. 3) and the plurality of receiving electrodes R may be formed on a side of a second insulation layer (reference numeral 130 of FIG. 3) different from the first insulation layer.

The plurality of driving electrodes T and the plurality of receiving electrodes R may be made of a transparent conductive material (for example, indium tin oxide (ITO) or antimony tin oxide (ATO)), or the like. However, this is just an example. The driving electrode T and the receiving electrode R may be also made of another transparent conductive material or an opaque conductive material like copper, etc. In the embodiment of the present invention, the driving electrode T may correspond to a first electrode T which is described with reference to FIGS. 5 to 8, and the receiving electrode R may correspond to a second electrode R. According to the embodiment, the driving electrode T and the receiving electrode R may include a third electrode C respectively. In the present specification, the third electrode C may be made of the same material as that of the first electrode T and/or second electrode R by the same process as that of the first electrode T and/or second electrode R.

The touch sensor panel 100 according to the embodiment of the present invention may include a plurality of third electrodes C. This will be described in more detail with reference to FIGS. 5 to 8.

The driving signal supplier 200 according to the embodiment of the present invention may apply a driving signal to the driving electrode T. In the touch input device 1000 according to the embodiment of the present invention, one driving signal may be sequentially applied to each of the plurality of driving electrodes at a time. The driving signal may be applied again repeatedly. This is just an example. According to the embodiment, the driving signal may be simultaneously applied to the plurality of driving electrodes. Here, the sensing unit 300 may sense a capacitance change amount by receiving a signal including information on the capacitance through the receiving electrode R. As such, the process in which the driving signal applied to the plurality of driving electrodes T is sensed through the receiving electrode R can be referred to as a process of scanning the touch sensor panel 100.

When an object like a finger or stylus pen approaches close to the touch sensor panel 100, the value of the capacitance through the driving electrode T and receiving electrode R may be changed. The sensing unit 300 senses such electrical characteristics, thereby sensing whether or not the touch has occurred on the touch sensor panel 100 and where the touch has occurred. For example, the sensing unit 300 is able to sense whether or not the touch has occurred on the touch sensor panel 100 comprised of a two-dimensional plane consisting of a first axis and a second axis, and/or where the touch has occurred. The touch input device 1000 according to the embodiment of the present invention may sense the touch pressure as well.

More specifically, when the touch occurs on the touch sensor panel 100, the driving electrode T to which the driving signal has been applied is detected, so that the second axial direction position of the touch can be detected. Likewise, when the touch occurs on the touch sensor panel 100, the capacitance change is detected from the reception signal received through the receiving electrode R, so that the first axial direction position of the touch can be detected.

The touch input device 1000 according to the embodiment of the present invention may further include a controller 400 capable of controlling the operations of the touch sensor panel 100, the driving signal supplier 200, and the sensing unit 300. The touch sensor panel 100 and the controller 400 will be described in more detail with reference to FIGS. 2 to 8.

Hereafter, the principle of detecting the touch position and touch pressure when the touch occurs on the touch sensor panel 100 will be described with reference to FIG. 2.

Figure 2:
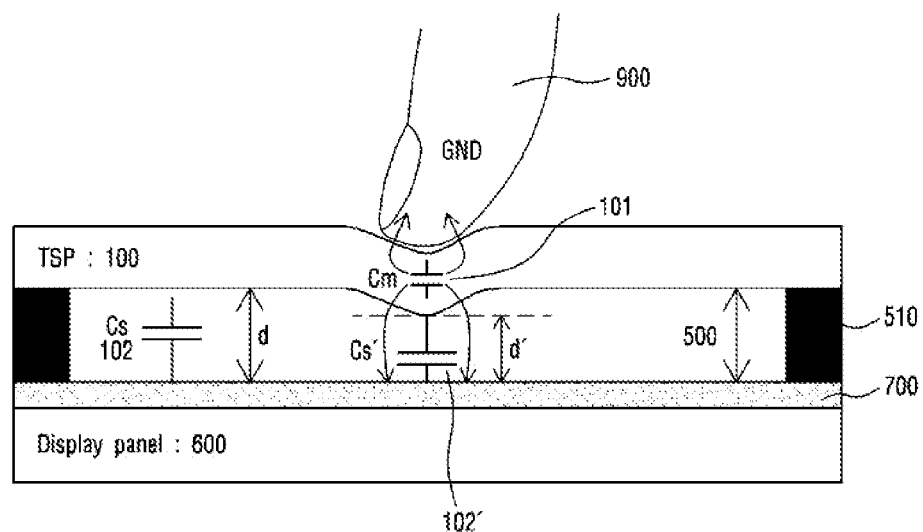
FIG. 2 is a cross sectional view showing a state at the time of applying a pressure to the touch input device according to the embodiment of the present invention.

FIG. 2 is a cross sectional view showing a state at the time of applying a pressure to the touch input device 1000 according to the embodiment of the present invention. The touch input device 1000 according to the embodiment of the present invention may include a display panel 600. The touch sensor panel 100 of the touch input device 1000 according to the embodiment of the present invention may be disposed on or within the display panel 600. While FIG. 2 shows that the touch sensor panel 100 is disposed on the display panel 600, this is just an example. The position of the touch sensor panel 100 is not limited to this. The display panel 600 in which the touch sensor panel 100 of the touch input device 1000 according to the embodiment of the present invention may be formed may be included in a liquid crystal display (LCD), an organic light emitting diode (OLED), etc. Although the reference numeral 600 of FIG. 2 is given to the display panel, the display panel may be constituted by any substrate.

As shown in FIG. 2, the touch input device 1000 according to the embodiment of the present invention may include a reference potential layer 700. The reference potential layer 700 may be disposed apart from the driving electrode T, the receiving electrode R, and the below-described third electrode C which are included in the touch sensor panel 100 according to the embodiment of the present invention. As shown in FIG. 2, when the touch sensor panel 100 according to the embodiment of the present invention is coupled to the display panel 600, the reference potential layer 700 may be a ground layer of the display panel 600. Here, the reference potential layer 700 may have a parallel plane with the two-dimensional plane of the touch sensor panel 100. Also, the reference potential layer 700 may be formed on a parallel plane with the two-dimensional plane of the touch sensor panel 100 in a particular pattern.

As shown in FIG. 2, the touch sensor panel 100 is disposed apart from the display panel 600. Here, depending on a method for adhering the touch sensor panel 100 to the display panel 600, a space between the touch sensor panel 100 and the display panel 600 may be implemented in the form of an air gap or may be filled with a particular material or an adhesive.

FIG. 2 shows that the air gap 500 exists between the touch sensor panel 100 and the reference potential layer 700. Here, a double adhesive tape (DAT) 510 may be used to fix the touch sensor panel 100 and the display panel 600. For example, the areas of the touch sensor panel 100 and the display panel 600 are overlapped with each other. The touch sensor panel 100 and the display panel 600 are adhered to each other by adhering the edge portions of the touch sensor panel 100 and the display panel 600 through use of the DAT 510. The rest portions of the touch sensor panel 100 and the display panel 600 may be spaced apart from each other by a predetermined distance "d". Here, FIG. 2 shows that the reference potential layer 700 is disposed between the display panel 600 and the touch sensor panel 100, and the touch sensor panel 100 and the reference potential layer 700 are spaced apart from each other by a predetermined distance "d".

FIG. 2 shows that a pressure has been applied to the touch sensor panel 100 by touching the touch surface of the touch sensor panel 100 with an object 900. For convenience of description, FIG. 2 exaggeratedly shows that the touch sensor panel 100 is bent by the touch pressure.

Generally, even when the touch surface of the touch sensor panel 100 is touched without being bent, a mutual capacitance (Cm) 101 between the driving electrode T and the receiving electrode R is changed. That is, when the touch occurs on the touch sensor panel 100, the mutual capacitance (Cm) 101 may become smaller than a base mutual capacitance. This is because, when the conductive object 900 like a finger approaches close to the touch sensor panel 100, the object 900 functions as the ground GND, and then a fringing capacitance of the mutual capacitance (Cm) 101 is absorbed in the object 900. The base mutual capacitance is the value of the mutual capacitance between the driving electrode T and the receiving electrode R when there is no touch on the touch sensor panel 100.

As shown in FIG. 2, when the object 900 touches the touch surface of the touch sensor panel 100 and the pressure is applied to the touch surface, the touch sensor panel 100 may be bent. Here, the value of the mutual capacitance (Cm) 101 between the driving electrode T and the receiving electrode R may be more reduced. This is because the bend of the touch sensor panel 100 causes the distance between the touch sensor panel 100 and the reference potential layer 700 to be reduced from "d" to "d'", so that the fringing capacitance of the mutual capacitance (Cm) 101 is absorbed in the reference potential layer 700 as well as in the object 900. When a nonconductive object 900 touches, the change of the mutual capacitance (Cm) 101 may be simply caused by only the change of the distance "d-d'" between the touch sensor panel 100 and the reference potential layer 700.

Also, a self capacitance (Cs) 102 may be formed between the reference potential layer 700 and each of the driving electrode T and receiving electrode R. That is, the capacitance which is formed between the driving electrode T and the ground, and the capacitance which is formed between the receiving electrode R and the ground are the self capacitance respectively. When the pressure is not applied at the time of touching the touch sensor panel 100, the value of the self capacitance (Cs) 102 is not changed. This has nothing to do with whether the object 900 is conductive or non-conductive.

However, as shown in FIG. 2, when the object 900 touches the touch surface of the touch sensor panel 100 and the pressure is applied to the touch surface, the touch sensor panel 100 may be bent. Here, the value of the self capacitance (Cs) 102 of a portion having a reduced distance between the touch sensor panel 100 and the reference potential layer 700 may be increased. This is indicated by (Cs') 102 in the figure. This is because the distance between the touch sensor panel 100 and the reference potential layer 700 is reduced from "d" to "d'" due to the bend of the touch sensor panel 100.

In FIG. 2, it has been described that only the touch sensor panel 100 is bent and the display panel 600 is not bent when the space between the display panel 600 and the touch sensor panel 100 is filled with the air gap 500 and the pressure is applied to the touch sensor panel 100. Here, the air gap 500 is not necessarily filled with air. The air gap 500 may be filled with any flexible material. In other words, since the touch sensor panel 100 is bent and the reference potential layer 700 is not bent, the distance between the touch sensor panel 100 and the reference potential layer 700 may be changed at the portion to which the touch pressure has been applied when the pressure is applied to the touch sensor panel 100. Therefore, the change amount of the mutual capacitance (Cm) 101 and/or the change amount of the self capacitance (Cs) 102 is measured based on the change of the distance between the reference potential layer 700 and the touch sensor panel 100, so that the touch position and/or the magnitude of the touch pressure can be detected.

The method for detecting the touch position and/or the magnitude of the touch pressure in accordance with the embodiment of the present invention can be applied to a case where the display panel 600 and the touch sensor panel 100 have been completely laminated by an adhesive unlike FIG. 2. In this case, when the touch pressure is applied to the touch surface of the touch sensor panel 100, the display panel 600 as well as the touch sensor panel 100 is simultaneously bent. Therefore, the touch position and/or the magnitude of the touch pressure cannot be detected by measuring the change amount of the mutual capacitance (Cm) 101 and/or the change amount of the self capacitance (Cs) 102 on the basis of the change of the distance between the reference potential layer 700 and the touch sensor panel 100 which are disposed as shown in FIG. 2.

However, in this case, even when the touch sensor panel 100 is bent according to the touch pressure on the touch sensor panel 100, the reference potential layer 700 is not disposed as shown in FIG. 2 and is disposed on a position where the reference potential layer 700 is not bent. Accordingly, the touch pressure detection method according to the embodiment of the present invention can be applied. Therefore, the touch input device 1000 according to the embodiment of the present invention may include the reference potential layer 700 which is spaced apart from the touch sensor panel 100 and is not bent despite the touch pressure on the touch sensor panel 100. The reference potential layer 700 according to the embodiment of the present invention does not necessarily have to be the ground. According to the embodiment, the reference potential layer 700 may have any potential which causes the mutual capacitance and/or self capacitance to be changed in accordance with the distance between the electrode and the reference potential layer 700.

Figure 3:
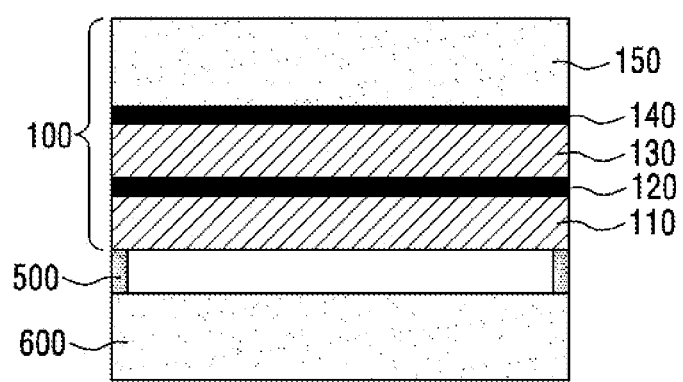
FIG. 3 is a cross sectional view of the touch input device according to the embodiment of the present invention.

FIG. 3 is a cross sectional view of the touch input device 1000 according to the embodiment of the present invention. FIG. 3 shows the magnified touch sensor panel 100 in the cross sectional view of the touch input device 1000 shown in FIG. 2. The touch sensor panel 100 according to the embodiment of the present invention may include a first electrode layer 120 formed on one side of the first insulation layer 110 and a second electrode layer 140 formed on one side of the second insulation layer 130.

Here, the first and second insulation layers 110 and 130 may be formed of a plastic-made thin transparent film like polyethylene terephthalate (PET). The touch surface which is touchable by the object 900 may be formed on the outer surface of a third insulation layer 150. Also, while FIG. 3 shows that the second electrode layer 140 has been adhered to the third insulation layer 150 like glass, this is just an example. The third insulation layer 150 and the second electrode layer 140 may be adhered to each other with an optical clear adhesive (OCA) (not shown) placed therebetween. In addition, according to the embodiment, the first electrode layer 120 and the second insulation layer 130 may be adhered to each other with the OCA placed therebetween.

In the touch input device 1000 according to the embodiment of the present invention, the touch sensor panel 100 may include the first electrode T, the second electrode R, and the third electrode C. These three kinds of electrodes may be included in both the first electrode layer 120 and the second electrode layer 140.

Figure 4A:
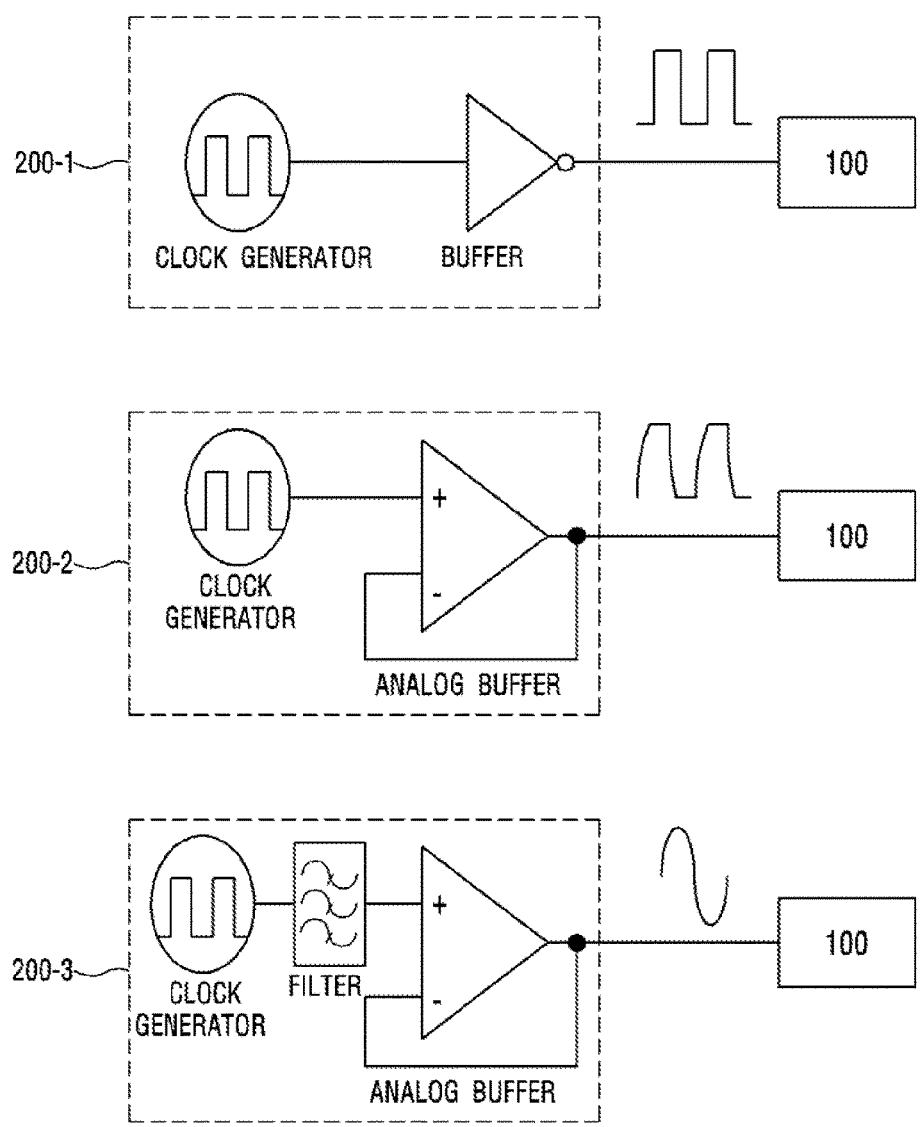
FIG. 4a is a circuit diagram of a driving signal supplier of the touch input device according to the embodiment of the present invention.

FIG. 4a is a circuit diagram of the driving signal supplier of the touch input device according to the embodiment of the present invention. The driving signal supplier 200 may be implemented in various forms. FIG. 4a shows three different circuit diagrams of the driving signal supplier 200. The driving signal supplier 200 may operate in response to a drive control signal generated from a drive control signal generator 420 included in the controller 400. A signal which is generated from a clock generator in response to the drive control signal is applied as a driving signal to the driving electrode T of the touch sensor panel 100 by the driving signal supplier 200.

In a first driving signal supplier 200-1, the signal generated from the clock generator may pass through a digital buffer and then may be applied to the touch sensor panel 100.

In a second driving signal supplier 200-2, the signal generated from the clock generator may pass through an analog buffer like an operational amplifier (OP-amp) and then may be applied to the touch sensor panel 100. Here, a rise/fall slope of the signal which is applied to the touch sensor panel 100 is not sharper than that of the signal of the first driving signal supplier 200-1, so that characteristics related to electromagnetic interference (EMI) can be improved.

A third driving signal supplier 200-3 may further include a filter between the clock generator and the analog buffer. After the signal generated from the clock generator may be converted into a sine-wave through the filter and then may be inputted to the analog buffer. Here, since only a signal having a frequency for driving the driving electrode T is transmitted to the touch sensor panel 100, the EMI characteristics can be very significantly improved.

Figure 4B:
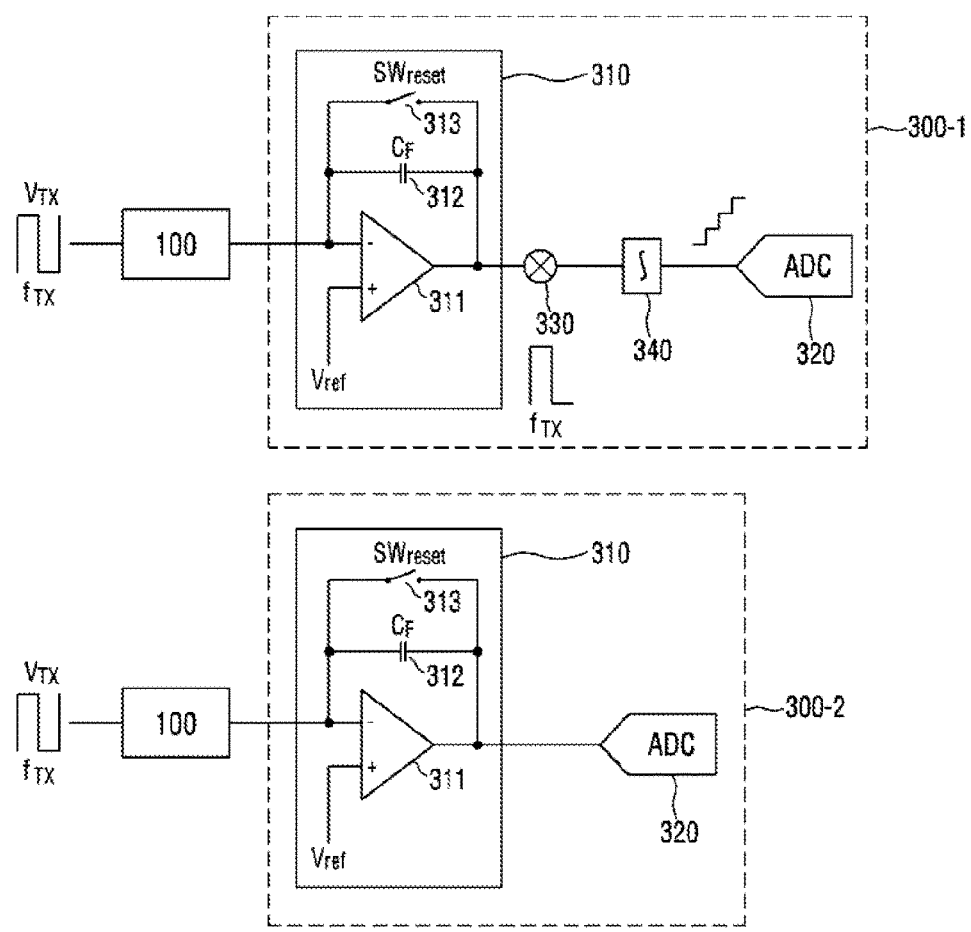
FIG. 4b is a circuit diagram of a sensing unit of the touch input device according to the embodiment of the present invention.

FIG. 4b is a circuit diagram of the sensing unit of the touch input device according to the embodiment of the present invention. The sensing unit 300 may be implemented in various forms. FIG. 4b shows two different circuit diagrams of the sensing unit 300. The sensing unit 300 may operate in response to a sensing control signal generated from a sensing control signal generator 430 included in the controller 400. The sensing unit 300 receives the signal from the receiving electrode R in response to the sensing control signal, and then detects the touch position/touch pressure.

The touch sensor panel 100 may include a capacitance sensor 310 and an analog to digital converter (ADC) 320. The capacitance sensor 310 may include an amplifier 311 and a feedback capacitor 312 coupled between the negative (−) input terminal of the amplifier 311 and the output terminal of the amplifier 311, that is to say, coupled to a feedback path. Here, the positive (+) input terminal of the amplifier may be connected to the ground or a reference potential Vref. Also, the capacitance sensor 310 may further include a reset switch 313 which is connected in parallel with the feedback capacitor 312. The reset switch 313 may reset the conversion from current to voltage that is performed by the capacitance sensor 310. The negative input terminal of the amplifier 311 is connected to the corresponding receiving electrode R and receives and integrates a current signal including information on the capacitances 101 and 102, and then converts the integrated current signal into voltage. The sensing unit 300 may further include the ADC 320 which converts an analog data signal which has passed through the capacitance sensor 310 into digital data. Later, the digital data may be input to a ' (not shown) and processed to obtain information on the touch on the touch sensor panel 100. The sensing unit 300 may include the processor as well as the capacitance sensor 310 and the ADC 320.

In a first sensing unit 300-1, the analog digital data signal which has passed through the capacitance sensor 310 is down-converted into a DC signal through a demodulator 330, and then the DC signal is integrated a predetermined number of times by using an integrator 340 and is inputted to the ADC 320.

In a second sensing unit 300-2, the data signal which is outputted from the capacitance sensor 310 may be inputted to the ADC 320. Here, the signal which is inputted to the ADC 320 has a frequency of the driving signal which is applied to the driving electrode T.

In the processor (not shown), an ADC difference value for each node between a case where the touch occurs and a case where the touch does not occur is obtained by using the signal which has passed through the ADC 320, and then a group consisting of the nodes of which the ADC difference value is greater than a predetermined threshold is made. Then, the center of gravity within the group is obtained, so that the touch position can be detected. Here, the node is designated as an area where the capacitance is generated by the crossing of the driving electrode T and the receiving electrode R.

Also, in the processor (not shown), the ADC difference value for each node between a case where the touch occurs and a case where the touch does not occur is obtained, and then a group consisting of nodes of which the ADC difference value is greater than a predetermined threshold is made. Then, the sum of the ADC difference value of a necessary area is obtained and then can be used as the magnitude of the pressure. For example, when one value of the pressure is required with respect to the entire area of the touch sensor panel 100, the ADC difference value of the entire area can be used as the magnitude of the pressure.

The above-described method for detecting the touch position/touch pressure by the processor is just an example. The touch position/touch pressure can be detected by other various methods.

Figure 4C:
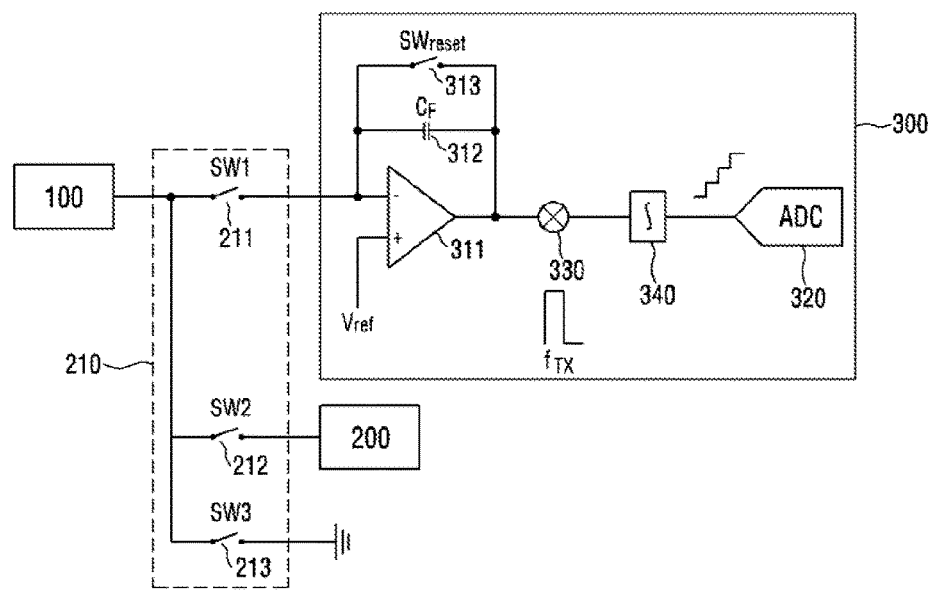
FIG. 4c is a circuit diagram of an impedance controller of the touch input device according to the embodiment of the present invention.

The mutual capacitance may be detected by applying the driving signal to the driving electrode T and then by sensing the capacitance between the driving electrode T and the receiving electrode R from the receiving electrode R. The self capacitance may be detected by applying the driving signal to one electrode and then by measuring the capacitance of the electrode itself through the electrode. For example, the self capacitance may be detected by various methods. The various method may include a method in which, after a certain voltage is charged in the electrode, the amount of charges charged in the capacitor within an integrated circuit (IC) is obtained through charge sharing between the capacitor within the IC and the capacitor of an outside line, or a method in which, after a certain amount of the current is charged in the capacitor of the outside line and a certain period of time elapses, the amount of charges charged in the capacitor within the IC is measured. FIG. 4c is a circuit diagram of an impedance controller of the touch input device according to the embodiment of the present invention. The impedance controller 210 may be implemented in various forms. FIG. 4c shows a circuit diagram according to the embodiment. The impedance controller 210 may operate in response to an impedance control signal generated from an impedance control signal generator 421 included in the controller 400. The impedance controller 210 may control the impedance of the third electrode C in response to the impedance control signal. In FIG. 4c, one end of the impedance controller 210 may be connected to the third electrode C included in the touch sensor panel 100.

When the third electrode C is used as the receiving electrode, a first switch 211 is closed and a second switch 212 and a third switch 213 are opened. In this case, the third electrode C is connected not only to the capacitance sensor 310 of the sensing unit 300 but also to a virtual ground node of the amplifier 311, and thus, is connected to a low impedance. Therefore, the third electrode C can function to shield noise.

When the third electrode C is used as the driving electrode, the first switch 211 and the third switch 213 are opened and the second switch 212 is closed. Here, one end of the second switch 212 is connected to the third electrode C and the other end of the second switch 212 is connected to the driving signal supplier 200. The driving signal is applied from the driving signal supplier 200 to the third electrode C. In this case, since the output impedance of a buffer (digital buffer, analog buffer), which is used as the final output of the driving signal supplier 200, is low, the third electrode C can function to shield the noise.

When the third electrode C is connected to the ground, the first switch 211 and the second switch 212 are opened and the third switch 213 is closed. Here, one end of the third switch 213 is connected to the third electrode C and the other end of the third switch 213 is connected to the ground. In this case, when the third electrode C is connected with the low impedance to the ground, the third electrode C can function to shield the noise.

When all of the first to third switches 211, 212 and 213 are opened, the third electrode C is in a floating state. While the foregoing has described that the impedance controller 210 controls the impedance of the third electrode C, the impedance controller 210 may be configured to control the impedances of the driving electrode T/receiving electrode R in accordance with the embodiment.

Figure 5:
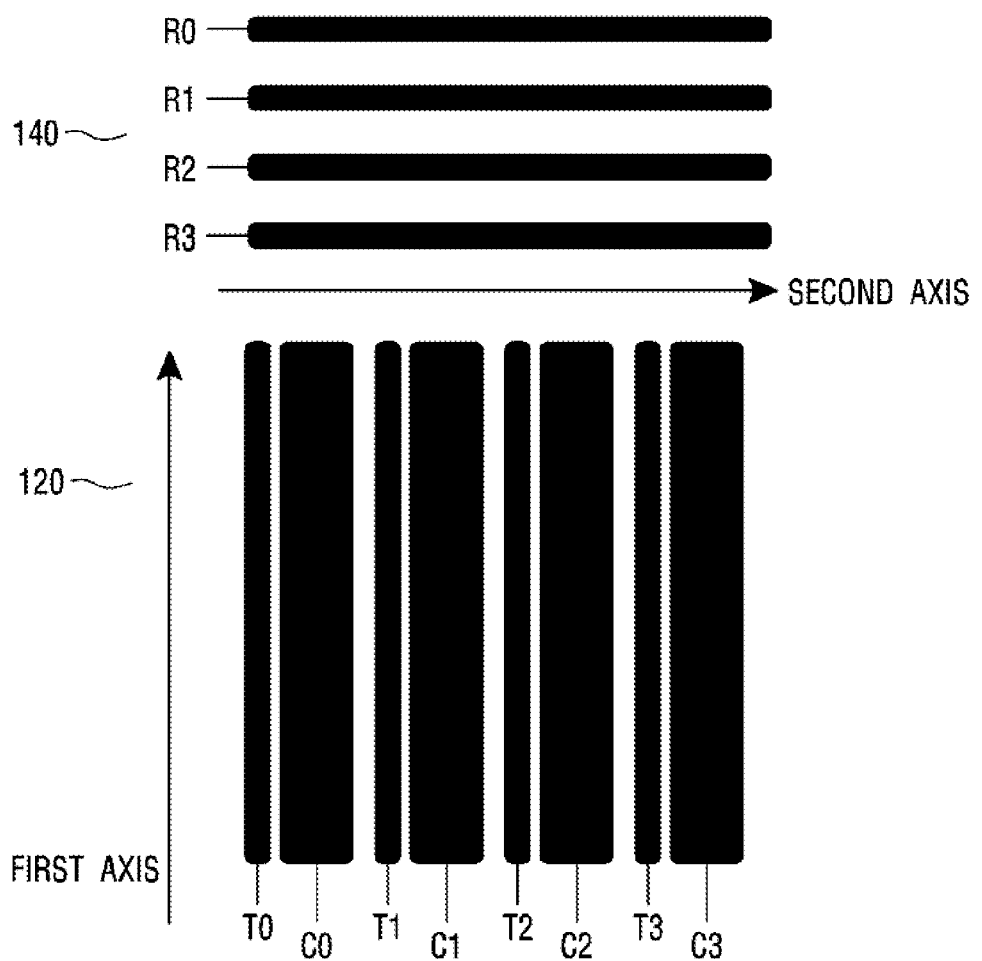
FIG. 5 shows a first configuration example of an electrode of the touch input device according to the embodiment of the present invention.

FIG. 5 shows a first configuration example of the electrode of the touch input device according to the embodiment of the present invention. FIG. 5 shows that the first electrode T and the third electrode C are positioned in the first electrode layer 120, and the second electrode R is positioned in the second electrode layer 140 which is positioned such that the insulation layer 130 is positioned between the first electrode layer 120 and the second electrode layer 140. In FIG. 5, the first electrode T may include a plurality of first electrodes T0, T1, T2 and T3 extending in the first axial direction. The second electrode R may include a plurality of second electrodes R0, R1, R2 and R3 extending in the second axial direction crossing the first axial direction.

In the past, the touch sensor panel 100 has been configured to have two kinds of electrodes, that is, the driving electrode T and the receiving electrode R. Therefore, only one kind of the first electrode T is positioned in the first electrode layer 120. Here, in order to improve a function to shield the noise including an electromagnetic signal generated from a configuration like the display panel 600, it was common that the width of each of the plurality of first electrodes T is formed to be greater than that of the second electrode R of the receiving electrode. In such a conventional configuration, when the width of the first electrode T is large, it was easy to sense the touch position in the two-dimensional plane consisting of the first axis and the second axis by sensing the mutual capacitance change between the first electrode T and the second electrode R. However, in the touch input device 1000 shown in FIG. 2 according to the embodiment of the present invention, when the first electrode T having a larger width is used, the change of the self capacitance between the reference potential layer 700 and the second electrode R is reduced and/or the change of the mutual capacitance between the first electrode T and the second electrode R is reduced by the reference potential layer 700, so that the measurement of the magnitude of the touch pressure may be interrupted.

Therefore, in order to solve such a problem in the embodiment of the present invention, the width of the first electrode T may be formed to be the same as that of the second electrode R. That is, the width of the first electrode T may be formed not to be larger than that of the second electrode R. In this case, the detection accuracy of the two-dimensional touch position may be deteriorated due to the noise. Additionally, in order to overcome such a problem, the embodiment of the present invention may further include the third electrode C.

In FIG. 5, as with the first electrode T, the third electrode C may include a plurality of third electrodes C0, C1, C2 and C3 extending in the first axial direction. This is just an example. The third electrode C may have another shape and/or another extension direction in accordance with the embodiment.

The controller 400 according to the embodiment of the present invention may include the impedance control signal generator 421 to reduce the effect of the noise by controlling the operation of the third electrode C through the impedance control signal, thereby making it possible to minimize errors in the detection of the touch position and to accurately measure the magnitude of the touch pressure. Hereafter, the operation examples of the third electrode C, first electrode T and second electrode R by the controller 400 according to the embodiment of the present invention will be described.

First Example of Operation

The controller 400 according to the embodiment of the present invention may control the sensing unit 300 through the sensing control signal and the impedance control signal. The controller 400 may control the sensing unit 300 to receive not only the first signal including information on the capacitance changing depending on the touch on the touch surface of the touch sensor panel 100 from the plurality of second electrodes R, but also a second signal including information on the capacitance changing depending on the touch on the touch surface of the touch sensor panel from the plurality of third electrodes C.

The sensing unit 300 may detect the touch position in the two-dimensional plane consisting of the first axis and the second axis from the first signal. Here, since the third electrode C also functions as the receiving electrode, when the sensing unit 300 detects the touch position, the third electrode C is connected with the low impedance to a DC voltage, thereby performing a shielding function. Therefore, the errors due to the noise may be reduced in the detection of the touch position.

The sensing unit 300 may detect the magnitude of the touch pressure from the second signal received from the third electrode C functioning as the receiving electrode. Here, any configuration with a shielding function does not exist between the reference potential layer 700 and both the first electrode T and the third electrode C. Therefore, not only the occurrence of the change of the mutual capacitance formed between the first electrode T and the third electrode C, but also the occurrence of the change of the self capacitance through the relationship with the reference potential layer 700 is not interrupted, so that the detection accuracy of the touch pressure can be improved through the second signal from the third electrode C.

Second Example of Operation

The controller 400 according to the embodiment of the present invention may control the plurality of third electrodes C through the impedance control signal. The controller 400 may control the plurality of third electrodes C to be maintained at a first impedance in a first time interval and to be maintained at a second impedance in a second time interval different from the first time interval. Here, the second impedance may be greater than the first impedance. The controller 400 divides time required for the sensing unit 300 to receive the signal from the second electrode R and controls such that the third electrode C is maintained at the first impedance in the first time interval and the third electrode C is maintained at the second impedance in the second time interval.

The sensing unit 300 may detect the touch position in the two-dimensional plane consisting of the first axis and the second axis from the first signal received from the second electrode R during the first time interval. Here, the third electrode C is maintained at the low impedance and is connected to the DC voltage, thereby performing a shielding function. Therefore, the errors due to the noise can be reduced in the detection of the touch position. In the present specification, it is possible to control the third electrode C to have the low impedance so as to perform the shielding function.

The impedance means an alternating current (AC) resistance value of a current flow. According to the embodiment of the present invention, the low impedance for performing the shielding function may have a resistance value less than 10 KΩ. In the present specification, a shielding impedance for shielding the noise may be designated as a low impedance. When the third electrode C having an impedance greater than 10 KΩ is applied to the DC voltage, it is difficult for the third electrode C to perform the shielding function. In the present specification, the low impedance or the first impedance may be interpreted the same as the shielding impedance which causes the shielding function to be performed. The low impedance or the first impedance may be set differently according to the embodiment, for example, may have a range less than 10 KΩ. For the purpose of performing the shielding function, the third electrode C according to the embodiment of the present invention may be connected with the low impedance to the ground or the DC voltage such as a direct current (DC) power. In the present specification, the case where the third electrode C is maintained at the low impedance may include a case where the third electrode C is maintained at the ground potential.

The sensing unit 300 may detect the magnitude of the touch pressure during the second time interval from the first signal received from the second electrode R. Here, since the third electrode C is connected with a high impedance to the DC voltage, it does not perform the shielding function. Therefore, not only the occurrence of the change of the mutual capacitance formed between the first electrode T and the second electrode R, but also the occurrence of the change of the self capacitance through the relationship with the reference potential layer 700 is not interrupted, so that the detection accuracy of the touch pressure can be improved through the first signal from the second electrode R.

According to the embodiment of the present invention, the second impedance of the third electrode C may have a resistance value higher than 1000Ω. A shielding prevention impedance which prevents the noise from being shielded may be designated as a high impedance. The shielding function may be decreased with the increase of the resistance value, and the shielding function may be improved with the decrease of the resistance value. When the third electrode C is applied with an impedance less than 1000Ω to the DC voltage, the noise shielding performance may be very high. In the present specification, the high impedance or the second impedance may be interpreted the same as the shielding prevention impedance which decreases the shielding function. The high impedance or the second impedance may be set differently according to the embodiment, for example, may have a range greater than 1000Ω. According to the embodiment of the present invention, in order not to perform the shielding function, the third electrode C may be connected with the high impedance to the ground or the DC voltage such as a direct current (DC) power. Also, in the present specification, the case where the third electrode C is maintained at the second impedance may include a case where the third electrode C is maintained in the floating state. In the floating state, the resistance value may be infinite.

Third Example of Operation

The controller 400 according to the embodiment of the present invention may control the sensing unit 300 through the sensing control signal and the impedance control signal. The controller 400 may control the sensing unit 300 to receive, in the first time interval, the first signal including information on the capacitance changing depending on the touch on the touch surface of the touch sensor panel 100 from the plurality of second electrodes R and to receive, in the second time interval different from the first time interval, the second signal including information on the capacitance changing depending on the touch on the touch surface of the touch sensor panel from the plurality of third electrodes C.

Here, the controller 400 may control such that the plurality of third electrodes C are maintained at the low impedance during the first time interval and the plurality of second electrodes R are maintained at the low impedance during the second time interval. Here, the low impedance may be less than 10 KΩ.

The sensing unit 300 may detect the touch position during the first time interval in the two-dimensional plane consisting of the first axis and the second axis from the first signal received from the second electrode R. Here, the third electrode C is connected with the low impedance to the DC voltage and performs the shielding function. Therefore, the errors due to the noise can be reduced in the detection of the touch position.

The sensing unit 300 may detect the magnitude of the touch pressure during the second time interval from the second signal received from the third electrode C. Here, any configuration with the shielding function does not exist between the reference the potential layer 700 and both the first electrode T and the third electrode C. Therefore, not only the occurrence of the change of the mutual capacitance formed between the first electrode T and the third electrode C, but also the occurrence of the change of the self capacitance through the relationship with the reference potential layer 700 is not interrupted, so that the detection accuracy of the touch pressure can be improved through the second signal from the third electrode C. Here, since the second electrode R is maintained at the low impedance, noise coming from a direction facing the display panel 600 can be shielded.

Fourth Example of Operation

The controller 400 according to the embodiment of the present invention may control the driving signal supplier 200 through the drive control signal. The controller 400 may control the driving signal supplier 200 to apply the driving signal to the plurality of first electrodes T and the plurality of third electrodes C in the first time interval and to apply the driving signal to only the plurality of first electrodes T in the second time interval different from the first time interval. Here, the controller 400 may control through the impedance control signal such that the third electrode C is maintained at the shielding prevention impedance during the second time interval. Here, the shielding prevention impedance may be greater than 1000Ω.

The controller 400 divides time required for the driving signal supplier 200 to apply the driving signal and controls such that the third electrode C as well as the first electrode T functions as the driving electrode in the first time interval and only the first electrode T functions as the driving electrode in the second time interval.

The sensing unit 300 may detect the touch position during the first time interval in the two-dimensional plane consisting of the first axis and the second axis from the first signal received from the second electrode R. Here, since the third electrode C functions as the driving electrode, the third electrode C is connected with the low impedance to the DC voltage and performs the shielding function. Therefore, the errors due to the noise can be reduced in the detection of the touch position.

The sensing unit 300 may detect the magnitude of the touch pressure during the second time interval from the first signal received from the second electrode R. Here, since the third electrode C is maintained at the high impedance, it does not perform the shielding function. Therefore, not only the occurrence of the change of the mutual capacitance formed between the first electrode T and the second electrode R, but also the occurrence of the change of the self capacitance through the relationship with the reference potential layer 700 is not interrupted, so that the detection accuracy of the touch pressure can be improved through the first signal from the second electrode R.

Fifth Example of Operation

The controller 400 according to the embodiment of the present invention may control the driving signal supplier 200 through the drive control signal and the sensing control signal. The controller 400 may control the driving signal supplier 200 to apply the driving signal to the plurality of first electrodes T and the plurality of third electrodes C in the first time interval and may control the sensing unit 300 to receive, in the second time interval different from the first time interval, the second signal including information on the capacitance changing depending on the touch on the touch surface of the touch sensor panel 100 from the plurality of third electrodes C.

The controller 400 divides time required for the driving signal supplier 200 to apply the driving signal and controls such that the third electrode C as well as the first electrode T functions as the driving electrode in the first time interval and only the first electrode T functions as the driving electrode in the second time interval. Likewise, the controller 400 may control such that the plurality of second electrodes R function as the receiving electrode in the first time interval and the plurality of third electrodes C function as the receiving electrode in the second time interval. There is no need to exclude the function of the second electrode R as the receiving electrode in the second time interval.

The sensing unit 300 may detect the touch position during the first time interval in the two-dimensional plane consisting of the first axis and the second axis from the first signal received from the second electrode R. Here, since the third electrode C functions as the driving electrode, the third electrode C is connected with the low impedance to the DC voltage and performs the shielding function. Therefore, the errors due to the noise can be reduced in the detection of the touch position.

The sensing unit 300 may detect the magnitude of the touch pressure during the second time interval from the second signal received from the third electrode C. Here, any configuration with the shielding function does not exist between the reference potential layer 700 and both the first electrode T and the third electrode C. Therefore, not only the occurrence of the change of the mutual capacitance formed between the first electrode T and the third electrode C, but also the occurrence of the change of the self capacitance through the relationship with the reference potential layer 700 is not interrupted, so that the detection accuracy of the touch pressure can be improved through the second signal from the third electrode C.

Figure 6:
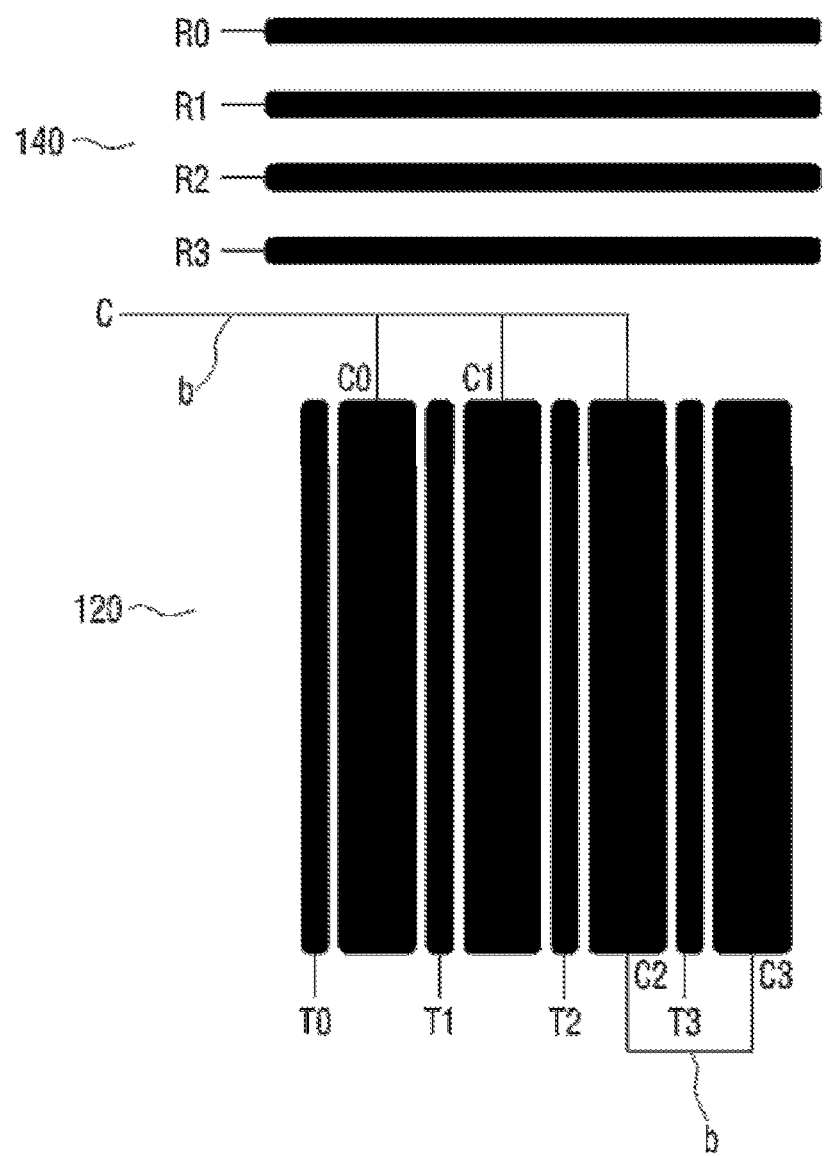
FIG. 6 shows a second configuration example of the electrode of the touch input device according to the embodiment of the present invention.

FIG. 6 shows a second configuration example of the electrode of the touch input device according to the embodiment of the present invention. That is to say, in the descriptions related to FIG. 5 and the following FIG. 7, since the plurality of third electrodes C are not electrically connected to each other, a separate channel can be constituted. However, this is just an example. At least two of the plurality of third electrodes C may be electrically connected to each other. FIG. 6 shows that the third electrode C is configured by electrically connecting four third electrodes C0, C1, C2 and C3 to each other through a conductive trace "b". The number of the electrodes which can be electrically connected to each other among the plurality of third electrodes C may be freely determined. For example, it is possible that each two of the plurality of third electrodes C are electrically connected to each other or each three or each any number of the plurality of third electrodes C are electrically connected to each other.

As shown in FIG. 6, since the channel can be shared among the plurality of third electrodes C connected electrically to each other, the number of pins can be reduced. In the embodiment of the present invention, when the third electrode C is maintained at the first low impedance or the second high impedance or when the third electrode C functions as the receiving electrode detecting the pressure or when the third electrode C functions as the driving electrode to which the driving signal is applied, only one channel may be constituted by electrically connecting between the plurality of third electrodes. The magnitude of the touch pressure can be obtained from the signal in which the sum of the capacitance change amount has been reflected through one channel. This can be applied to the embodiments throughout the specification.

Figure 7:
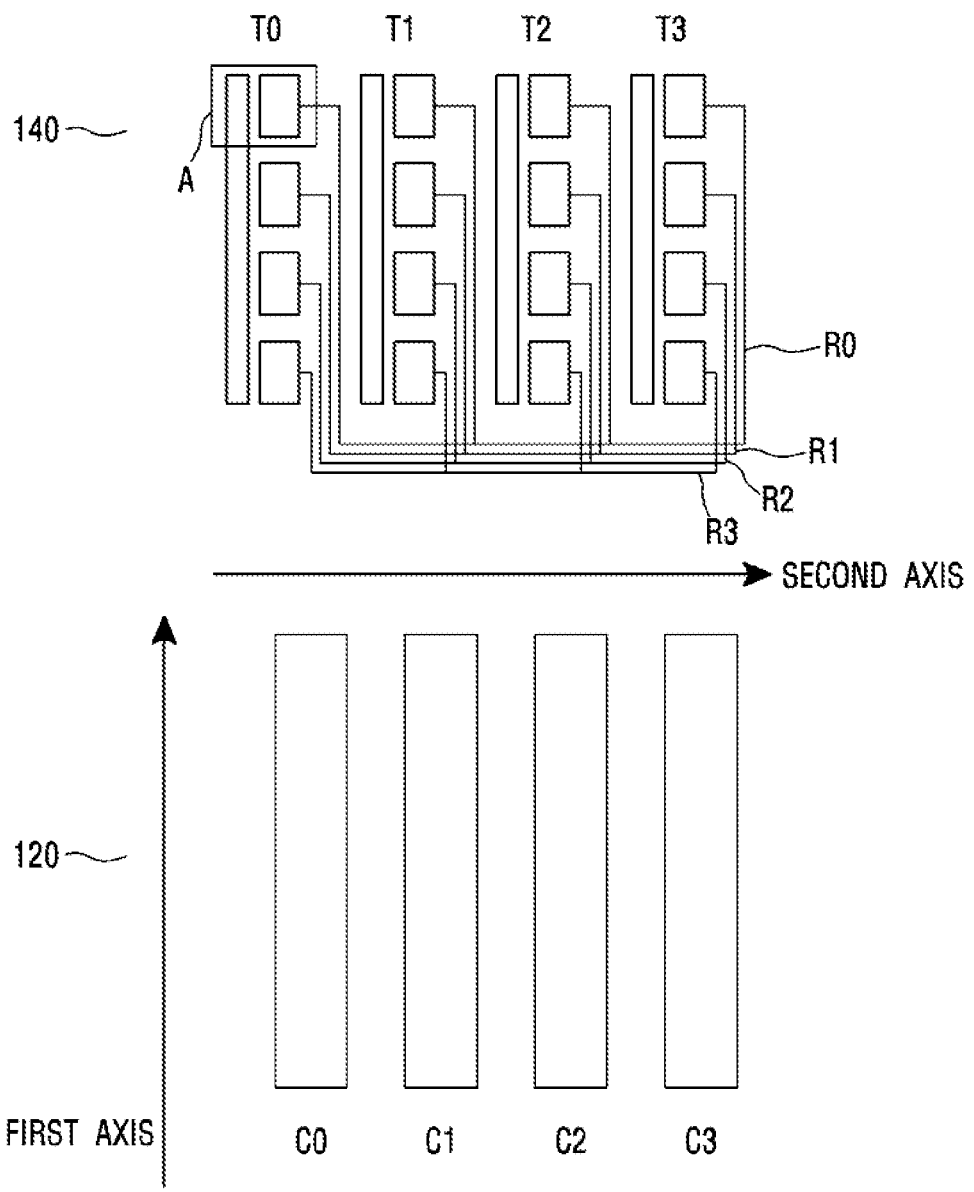
FIG. 7 shows a third configuration example of the electrode of the touch input device according to the embodiment of the present invention.

FIG. 7 shows a third configuration example of the electrode of the touch input device according to the embodiment of the present invention. FIG. 7 shows that the third electrode C is positioned in the first electrode layer 120, and the first electrode T and the second electrode R are positioned in the second electrode layer 140 which is positioned such that the insulation layer 130 is positioned between the first electrode layer 120 and the second electrode layer 140. While FIG. 7 shows a particular pattern, the first electrode T and the second electrode R are formed in the same layer, so that a pattern which has any shape and is capable of detecting the touch position and touch pressure may be included.

In FIG. 7, the first electrode T and the second electrode R may be formed in the same layer and configured to detect the touch pressure as well as touch position on the touch sensor panel 100. As shown in FIG. 7, the plurality of first electrodes T and the plurality of second electrodes R may form a touch detection area including a plurality of sensing cells "A" arranged in a matrix consisting of M number of columns extending in the second axial direction and N number of rows extending in the first axial direction (M×N, M and N are natural numbers).

Here, each of the plurality of sensing cells "A" may include the first electrode T and the second electrode R which do not contact each other. FIG. 7 shows that the shapes of the patterns in the sensing cells "A" are the same as each other. The first electrode T has a bar shape extending in the first axial direction. Therefore, when the touch occurs on the touch sensor panel, the touch position in the second axial direction can be detected by processing the signal of the first electrode T.

It can be seen that the second electrode R has a quadrangular pattern divided for each sensing cell "A". However, the conductive trace is connected to each second divided electrode included in the sensing cell "A". Here, as shown in FIG. 7, it can be understood that the second divided electrodes included in the same column are electrically connected to each other through the conductive trace. It can be found that the second divided electrodes included in different columns are electrically insulated from each other. Accordingly, four second divided electrodes positioned in the first column (uppermost column) form the electrode R0, four second divided electrodes positioned in the second column form the electrode R1. In the same manner, four second divided electrodes positioned in the fourth column form the electrode R3. Therefore, when the touch occurs on the touch sensor panel, the touch position in the first axial direction can be detected by processing the signal from the second electrode R.

FIG. 7 may further include the third electrode C in order to reduce the detection error by shielding the noise at the time of detecting the touch position and to improve the detection accuracy of the touch pressure. Here, the third electrode C may be positioned in the first electrode layer 120 which is positioned such that the insulation layer 130 is positioned between the second electrode layer 140 and the first electrode layer 120.

In FIG. 7, as with the first electrode T, the third electrode C may include the plurality of third electrodes C0, C1, C2 and C3 extending in the first axial direction. Here, the third electrode C may be formed to have a larger width so as to enhance the shielding function. While FIGS. 5 and 7 show that the third electrode C extends in the first axial direction, this is just an example. The third electrode C may have another shape and/or another extension direction in accordance with the embodiment.

The controller 400 according to the embodiment of the present invention may reduce the effect of the noise by controlling the operation of the third electrode C through the impedance control signal, thereby making it possible to minimize errors in the detection of the touch position and to accurately measure the magnitude of the touch pressure. Hereafter, the operation examples of the third electrode C, first electrode T and second electrode R by the controller 400 according to the embodiment of the present invention will be described with reference to FIG. 7.

Sixth Example of Operation

The controller 400 according to the embodiment of the present invention may control the plurality of third electrodes C through the impedance control signal. The controller 400 may control the plurality of third electrodes C to be maintained at the first impedance in the first time interval and to be maintained at the second impedance in the second time interval different from the first time interval. Here, the second impedance may be greater than the first impedance. The description thereabout can be obtained by reference to the description related to FIG. 5 and repetitive descriptions thereof will be omitted. The controller 400 divides time required for the sensing unit 300 to receive the signal from the second electrode R and controls such that the third electrode C is maintained at the first impedance in the first time interval and the third electrode C is maintained at the second impedance in the second time interval.

The sensing unit 300 may detect the touch position during the first time interval in the two-dimensional plane consisting of the first axis and the second axis from the first signal received from the second electrode R. Here, the third electrode C is maintained at the low impedance and is connected to the DC voltage, thereby performing the shielding function. Therefore, the errors due to the noise can be reduced in the detection of the touch position.

The sensing unit 300 may detect the magnitude of the touch pressure during the second time interval from the first signal received from the second electrode R. Here, since the third electrode C is connected with the high impedance to the DC voltage, it does not perform the shielding function. Therefore, not only the occurrence of the change of the mutual capacitance formed between the first electrode T and the second electrode R, but also the occurrence of the change of the self capacitance through the relationship with the reference potential layer 700 is not interrupted, so that the detection accuracy of the touch pressure can be improved through the first signal from the second electrode R.

Seventh Example of Operation

The controller 400 according to the embodiment of the present invention may control the driving signal supplier 200 through the drive control signal and the impedance control signal. The controller 400 may control the driving signal supplier 200 to apply the driving signal to the plurality of first electrodes T and the plurality of third electrodes C in the first time interval and to apply the driving signal to only the plurality of first electrodes T in the second time interval different from the first time interval. Here, the controller 400 may control such that the third electrode C is maintained at the shielding prevention impedance during the second time interval.

The controller 400 divides time required for the driving signal supplier 200 to apply the driving signal and controls such that the third electrode C as well as the first electrode T functions as the driving electrode in the first time interval and only the first electrode T functions as the driving electrode in the second time interval.

The sensing unit 300 may detect the touch position during the first time interval in the two-dimensional plane consisting of the first axis and the second axis from the first signal received from the second electrode R. Here, since the third electrode C functions as the driving electrode, the third electrode C is connected with the low impedance to the DC voltage and performs the shielding function. Therefore, the errors due to the noise can be reduced in the detection of the touch position.

The sensing unit 300 may detect the magnitude of the touch pressure during the second time interval from the first signal received from the second electrode R. Here, since the third electrode C is maintained at the high impedance, it does not perform the shielding function. Therefore, not only the occurrence of the change of the mutual capacitance formed between the first electrode T and the second electrode R, but also the occurrence of the change of the self capacitance through the relationship with the reference potential layer 700 is not interrupted, so that the detection accuracy of the touch pressure can be improved through the first signal from the second electrode R.

Figure 8:
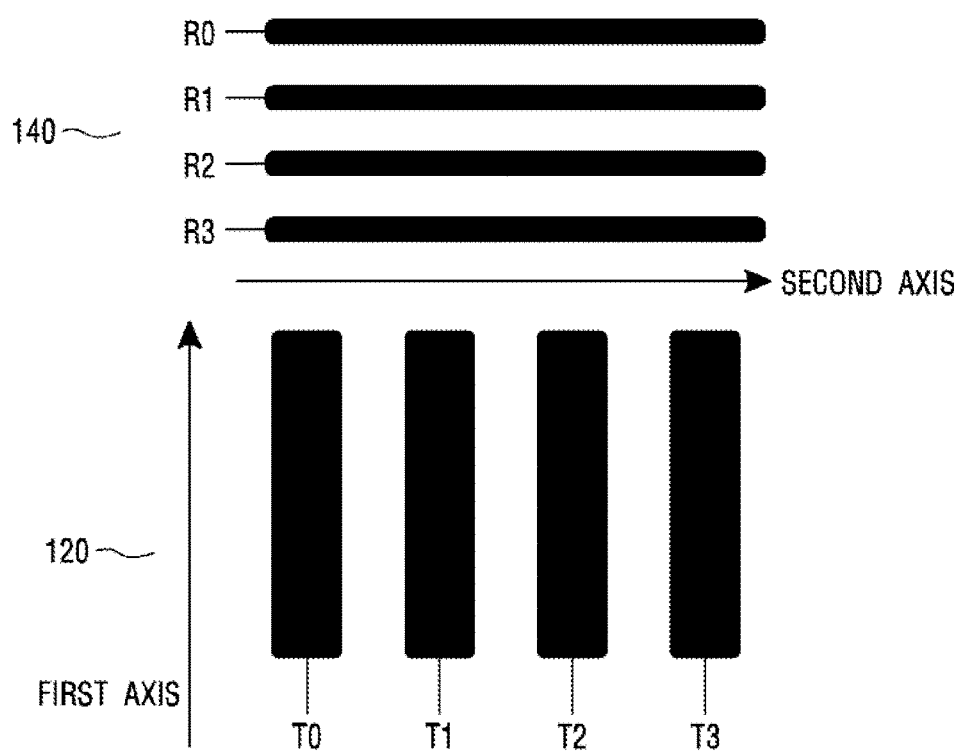
FIG. 8 shows a fourth configuration example of the electrode of the touch input device according to the embodiment of the present invention.

The shape and constituent material of the third electrode C according to the embodiment of the present invention is not necessarily distinguished from those of the first electrode T or the second electrode R. That is, the third electrode C may be formed to have the same shape and constituent material as those of the first electrode T. Therefore, the above-described embodiment of the present invention may be implemented by adopting the portion of the first electrode T, instead of explicitly and separately forming the third electrode C. FIG. 8 shows a fourth configuration example of the electrode of the touch input device according to the embodiment of the present invention. FIG. 8 shows that a configuration which includes only the plurality of first electrodes T and the plurality of second electrodes R are positioned with the insulation layer 130 placed therebetween, reduces the detection error by shielding the noise at the time of detecting the touch position, and improves the detection accuracy of the touch pressure. The plurality of first electrodes T may be positioned in the first electrode layer 120, and the second electrode R may be positioned in the second electrode layer 140 which is positioned such that the insulation layer 130 is positioned between the second electrode layer 140 and the first electrode layer 120. Here, the first electrode T may function not only as the driving electrode, but also as the third electrode C described relative to FIGS. 4 to 6.

The controller 400 according to the embodiment of the present invention may reduce the effect of the noise by controlling the operation of the second electrode T, thereby making it possible to minimize errors in the detection of the touch position and to accurately measure the magnitude of the touch pressure. Hereafter, the operation examples of the first electrode T and second electrode R by the controller 400 according to the embodiment of the present invention will be described with reference to FIG. 8.

Eighth Example of Operation

The controller 400 according to the embodiment of the present invention may control the driving signal supplier 200 through the drive control signal. The controller 400 may control the driving signal supplier 200 to apply the driving signal to the plurality of first electrodes T in the first time interval and to apply the driving signal to only some of the plurality of first electrodes T in the second time interval different from the first time interval. Also, the controller 400 may control the sensing unit 300 to receive, in the first time interval, the first signal including information on the capacitance changing depending on the touch on the touch surface of the touch sensor panel from the plurality of second electrodes and to receive, in the second time interval, the second signal including information on the capacitance changing depending on the touch on the touch surface of the touch sensor panel from remaining electrodes except for the some of the plurality of first electrodes.

For example, the entire plurality of first electrodes T may function as the driving electrode in the first time interval, and only some of the plurality of first electrodes T may function as the driving electrode in the second time interval. Here, included is a case where the number of the first electrodes T which are driven in the first time interval is greater than the number of the first electrodes T which are driven in the second time interval. All of the plurality of first electrodes T are not necessarily driven during the first time interval. Also, the above word "some" means an integer greater than 1 and may be less than the total number of the plurality of first electrodes T. For example, some electrodes may be odd numbered electrodes T1 and T3. Also, the second electrode R may function as the receiving electrode during the first time interval, and remaining electrodes T0 and T2 except for the some electrodes T1 and T3 of the plurality of first electrodes T may function as the receiving electrode during the second time interval. Here, the remaining electrodes T0 and T2 may include only some of electrodes except for the some electrodes T1 and T3 of the plurality of first electrodes T.

The sensing unit 300 may detect the touch position during the first time interval in the two-dimensional plane consisting of the first axis and the second axis from the first signal received from the second electrode R. Here, all of the first electrodes T are connected with the low impedance to the DC voltage and performs the shielding function. Therefore, the errors due to the noise can be reduced in the detection of the touch position.

The sensing unit 300 may detect the magnitude of the touch pressure from the second signal received from the remaining electrodes T0 and T2 except for the some electrodes T1 and T3 of the plurality of first electrodes T during the second time interval. Here, any configuration with the shielding function does not exist between the reference potential layer 700 and both the some electrodes T1 and T3 and the remaining electrodes T0 and T2. Therefore, not only the occurrence of the change of the mutual capacitance formed between the some electrodes T1 and T3 and the remaining electrodes T0 and T2, but also the occurrence of the change of the self capacitance through the relationship with the reference potential layer 700 is not interrupted, so that the detection accuracy of the touch pressure can be improved through the second signal from the remaining electrodes T0 and T2. Here, the function of the second electrode R as the receiving electrode is not excluded.

Ninth Example of Operation

The controller 400 according to the embodiment of the present invention may control the driving signal supplier 200 through the drive control signal. The controller 400 may control the driving signal supplier 200 to apply the driving signal to the plurality of first electrodes T in the first time interval and to apply the driving signal to only some T1 and T3 of the plurality of first electrodes T in the second time interval different from the first time interval. Here, the controller 400 may control such that the remaining electrodes T0 and T2 except for the some electrodes T1 and T3 of the plurality of first electrodes T are maintained at the shielding prevention impedance during the second time interval. Here, the shielding prevention impedance may be greater than 1000Ω.

For example, the plurality of first electrodes T may function as the driving electrode in the first time interval. Only the some electrodes T1 and T3 of the plurality of first electrodes T may function as the driving electrode in the second time interval.

The sensing unit 300 may detect the touch position during the first time interval in the two-dimensional plane consisting of the first axis and the second axis from the first signal received from the second electrode R. Here, since the first electrode T functions as the driving electrode, the third electrode C is connected with the low impedance to the DC voltage and performs the shielding function. Therefore, the errors due to the noise can be reduced in the detection of the touch position.

The sensing unit 300 may detect the magnitude of the touch pressure during the second time interval from the first signal received from the second electrode R. Here, since the remaining electrodes T0 and T2 except for the some electrodes T1 and T3 of the plurality of first electrodes T are maintained at the high impedance, they do not perform the shielding function. Therefore, Therefore, not only the occurrence of the change of the mutual capacitance formed between the some electrodes T1 and T3 and the second electrode R, but also the occurrence of the change of the self capacitance through the relationship with the reference potential layer 700 is not interrupted, so that the detection accuracy of the touch pressure can be improved through the first signal from the second electrode R.

The above-described driving signal supplier 200, impedance controller 210, sensing unit 300 and/or controller 400 may constitute a touch detector according to the embodiment of the present invention. The touch detector is a touch sensing chip of the touch input device 1000 and may be implemented on the integrated circuit. According to the embodiment, the touch detector may be designated as the entire touch input device 1000.

Hereafter, the touch detection method which separates and detects the touch position and touch pressure described with reference to FIGS. 1 to 8 will be briefly described with reference to FIG. 9.

Figure 9:
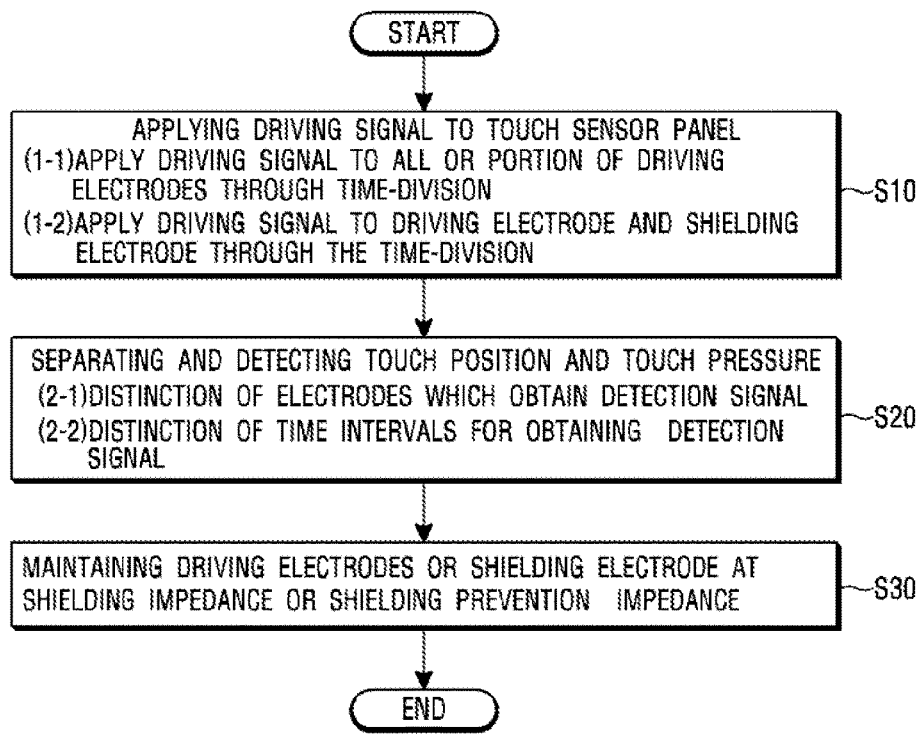
FIG. 9 is a flowchart of a touch detection method according to the embodiment of the present invention.

Referring to FIG. 9, the touch detection method according to the embodiment of the present invention may include applying the driving signal to the touch sensor panel (S10) and separating and detecting the touch position and touch pressure (S20).

Here, the separating and detecting the touch position and touch pressure (S20) may be performed to include distinguishing between an electrode which obtains a detection signal for detecting the touch position and an electrode which obtains a detection signal for detecting the touch pressure (2-1) and/or distinguishing between a time interval for detecting the touch position and a time interval for detecting the touch pressure, that is to say, the time-division (2-2). Here, any one of the above two distinguishing methods may be used or both of them may be used at the same time.

In the touch detection method according to the embodiment of the present invention, when it is intended to detect the touch position, the noise may be shielded, and when it is intended to detect the touch pressure, the noise may be prevented from being shielded. For the purpose of shielding the noise and of preventing the noise from being shielded, the applying the driving signal (S10) in the touch detection method according to the embodiment of the present invention may be performed to include applying the driving signal to all or a portion of the driving electrodes through the time-division (1-1) or applying the driving signal to the driving electrode and shielding electrode through the time-division (1-2). The applying the driving signal to the touch sensor panel (S10) is the same as the detailed description of the operation examples with reference to FIGS. 5 to 8.

Also, the touch detection method according to the embodiment of the present invention may further include maintaining a portion of the driving electrodes or the shielding electrode (third electrode) at the shielding impedance or shielding prevention impedance (S30) in order to shield or prevent shielding. The maintaining (S30) is also the same as the detailed description of the operation examples with reference to FIGS. 5 to 8. Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch detector which detects a touch on a touch sensor panel including a plurality of first electrodes, a plurality of second electrodes and a plurality of third electrodes, wherein the plurality of first electrodes and the plurality of second electrodes are formed in different layers with an insulation layer placed therebetween, and the plurality of third electrodes are formed in the same layer in which the plurality of first electrodes are formed, the touch detector comprising:
   a driving signal supplier which applies a driving signal to the plurality of first electrodes; and
   a sensing unit which receives a first signal including information on a capacitance changing depending on the touch on a touch surface of the touch sensor panel from the plurality of second electrodes formed in a different layer from the layer in which the plurality of first electrodes are formed, and receives a second signal including information on a capacitance changing depending on the touch on a touch surface of the touch sensor panel from the plurality of third electrodes formed in the same layer in which the plurality of first electrodes are formed,
   wherein the plurality of second electrodes are separate and distinct from the plurality of third electrodes, and
   wherein the sensing unit detects a touch pressure from the second signal and a touch position on the touch surface of the touch sensor panel from the first signal.

2. The touch detector of claim 1, wherein the sensing unit receives the first signal and the second signal at the same time, and wherein the sensing unit detects the touch position from the first signal and detects the touch pressure from the second signal.

3. The touch detector of claim 1, wherein the sensing unit receives the first signal in a first time interval and receives the second signal in a second time interval different from the first time interval, and wherein the sensing unit detects the touch position from the first signal in the first time interval and detects the touch pressure from the second signal in the second time interval.

4. The touch detector of claim 3, further comprising an impedance controller, wherein, through the impedance controller, the plurality of third electrodes are maintained at a shielding impedance in the first time interval.

5. The touch detector of claim 1,
   further comprising an impedance controller,
   further comprising a controller which, through the impedance controller, controls the plurality of third electrodes to be maintained at a first impedance in a first time interval and to be maintained at a second impedance in a second time interval different from the first time interval,
   wherein the second impedance is greater than the first impedance,
   and wherein the sensing unit detects the touch position from the first signal in the first time interval and detects the touch pressure from the first signal in the second time interval.

6. The touch detector of claim 1,
   further comprising an impedance controller,
   wherein the driving signal supplier applies the driving signal to the plurality of first electrodes and the plurality of third electrodes in a first time interval and applies the driving signal to the plurality of first electrodes in a second time interval different from the first time interval,
   wherein, through the impedance controller, the plurality of third electrodes are maintained at a shielding prevention impedance in the second time interval,
   and wherein the sensing unit detects the touch position in the first time interval and detects the touch pressure in the second time interval.

7. The touch detector of claim 1,
   wherein the driving signal supplier applies the driving signal to the plurality of first electrodes and the plurality of third electrodes in a first time interval,
   wherein, in a second time interval different from the first time interval, the sensing unit receives a second signal including information on the capacitance changing depending on the touch on the touch surface of the touch sensor panel from the plurality of third electrodes,
   and wherein the sensing unit detects the touch position in the first time interval and detects the touch pressure in the second time interval.

8. The touch detector of claim 1, wherein each of the plurality of first electrodes and plurality of second electrodes has a length and a shorter width, and wherein the width of each of the plurality of first electrodes is not larger than the width of each of the plurality of second electrodes.

9. A method for detecting a touch position and a touch pressure in a capacitive touch input device including a touch sensor panel including a plurality of first electrodes, a plurality of second electrodes and a plurality of third electrodes wherein the plurality of first electrodes and the plurality of second electrodes are formed in different layers with an insulation layer placed therebetween and the plurality of third electrodes are formed in the same layer in which the plurality of first electrodes are formed, and a driving signal supplier, the method comprising:
   applying a driving signal to the plurality of first electrodes of the touch sensor panel;
   receiving a first signal including information on a capacitance changing depending on the touch input on a touch surface of the touch sensor panel from the plurality of second electrodes formed in a different layer from the layer in which the plurality of first electrodes are formed,
   and a second signal including information on a capacitance changing depending on the touch input on a touch surface of the touch sensor panel from the plurality of third electrodes formed in the same layer in which the plurality of first electrodes are formed; and
   detecting a touch pressure from the second signal and a touch position on the touch surface of the touch sensor panel from the first signal,
   wherein the plurality of second electrodes are separate and distinct from the plurality of third electrodes.

10. The method of claim 9,
    wherein the detecting comprises detecting the touch position based on a first detection signal from the plurality of second electrodes in a first time interval and detecting the touch pressure based on a second detection signal from the plurality of third electrodes in a second time interval different from the first time interval,
    further comprising maintaining the plurality of third electrodes at a shielding impedance in the first time interval.

11. The method of claim 9,
wherein the detecting comprises detecting the touch position based on a first detection signal from the plurality of second electrodes in a first time interval and detecting the touch pressure based on the first detection signal in a second time interval different from the first time interval,
further comprising maintaining the plurality of third electrodes at a first impedance in the first time interval and maintaining the plurality of third electrodes at a second impedance in the second time interval,
wherein the second impedance is greater than the first impedance.

12. The method of claim 9,
wherein the applying the driving signal comprises applying the driving signal to the plurality of first electrodes and the plurality of third electrodes in a first time interval and applying the driving signal to the plurality of first electrodes in a second time interval different from the first time interval,
and wherein the detecting comprises detecting the touch position based on a first detection signal from the plurality of second electrodes in the first time interval and detecting the touch pressure based on a second detection signal from the plurality of third electrodes in the second time interval.

13. The method of claim 9,
wherein the applying the driving signal comprises applying the driving signal to the plurality of first electrodes and the plurality of third electrodes in a first time interval and applying the driving signal to the plurality of first electrodes in a second time interval,
wherein the detecting comprises detecting the touch position based on a first detection signal from the plurality of second electrodes in the first time interval and detecting the touch pressure based on the first detection signal in the second time interval different from the first time interval, and
wherein the plurality of third electrodes are maintained at a shielding prevention impedance in the second time interval.

14. The method of claim 9, further comprising maintaining remaining electrodes except for the some of the plurality of first electrodes at a shielding prevention impedance in the second time interval.

* * * * *